March 11, 1952 — J. A. ABEL ET AL — 2,588,454
PIE MAKING MACHINE
Filed Nov. 26, 1945 — 3 Sheets-Sheet 1
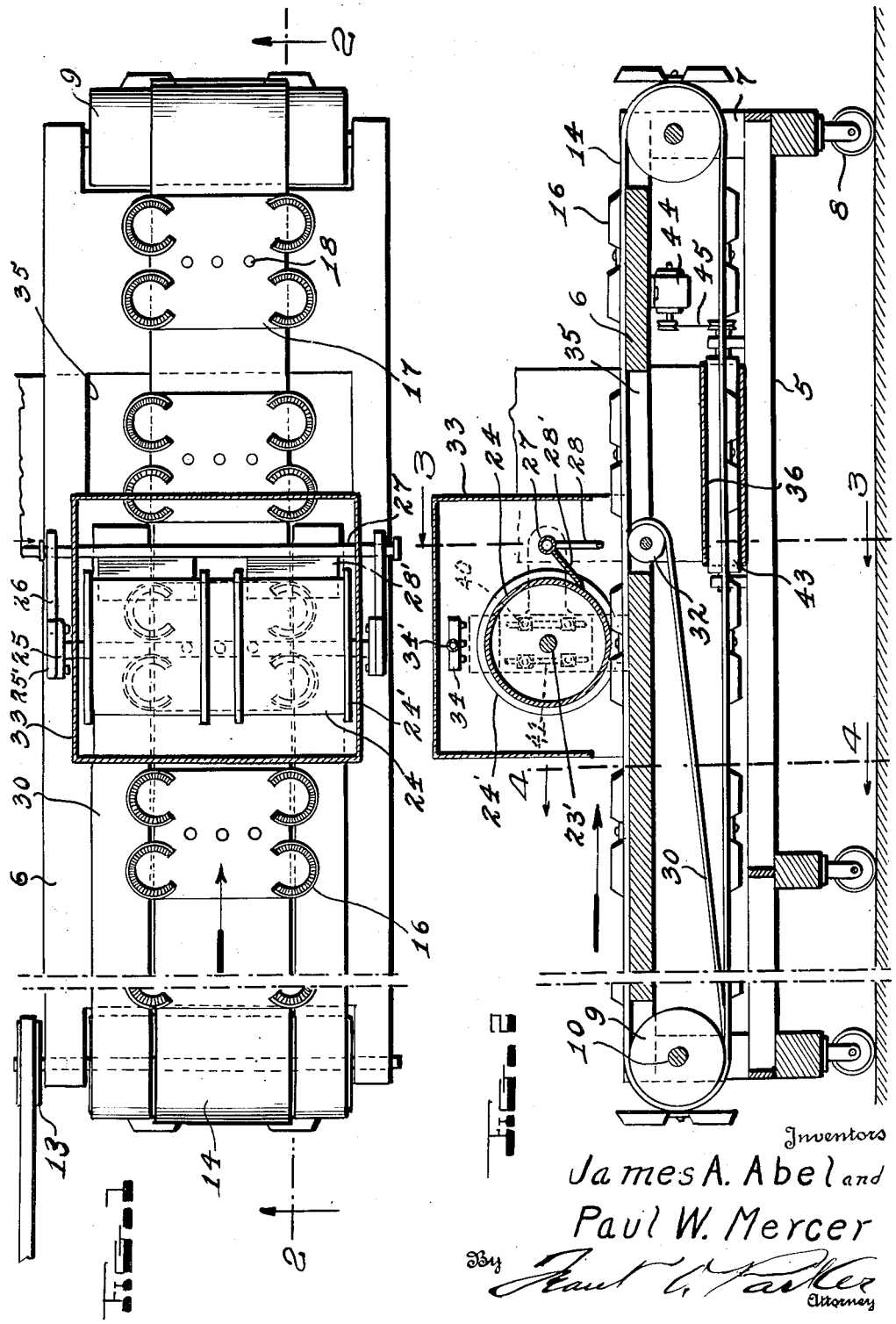
Inventors
James A. Abel and
Paul W. Mercer March 11, 1952 J. A. ABEL ET AL 2,588,454
PIE MAKING MACHINE
Filed Nov. 26, 1945 3 Sheets-Sheet 2
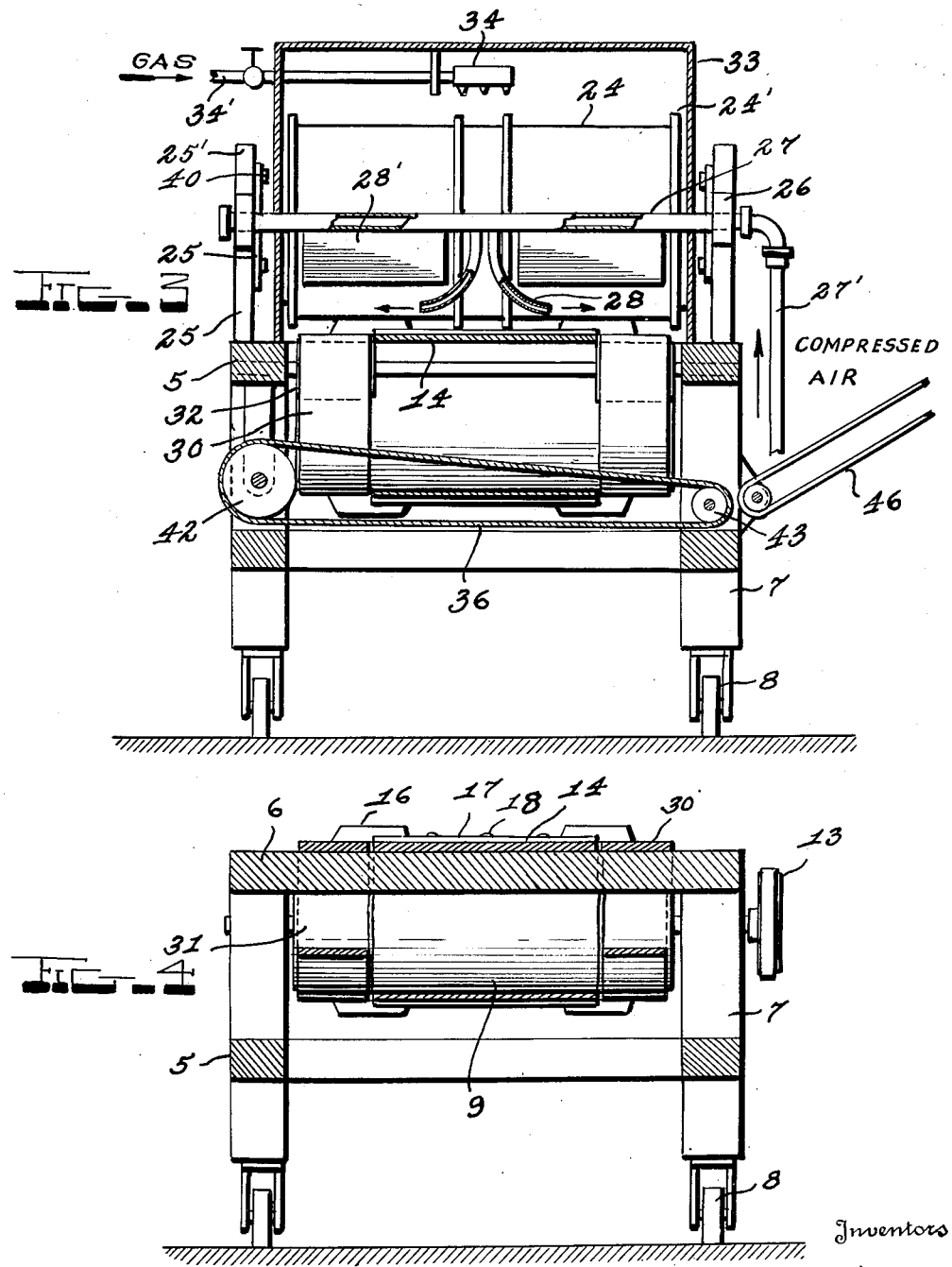
Inventors
James A. Abel and
Paul W. Mercer March 11, 1952   J. A. ABEL ET AL   2,588,454
PIE MAKING MACHINE
Filed Nov. 26, 1945   3 Sheets-Sheet 3
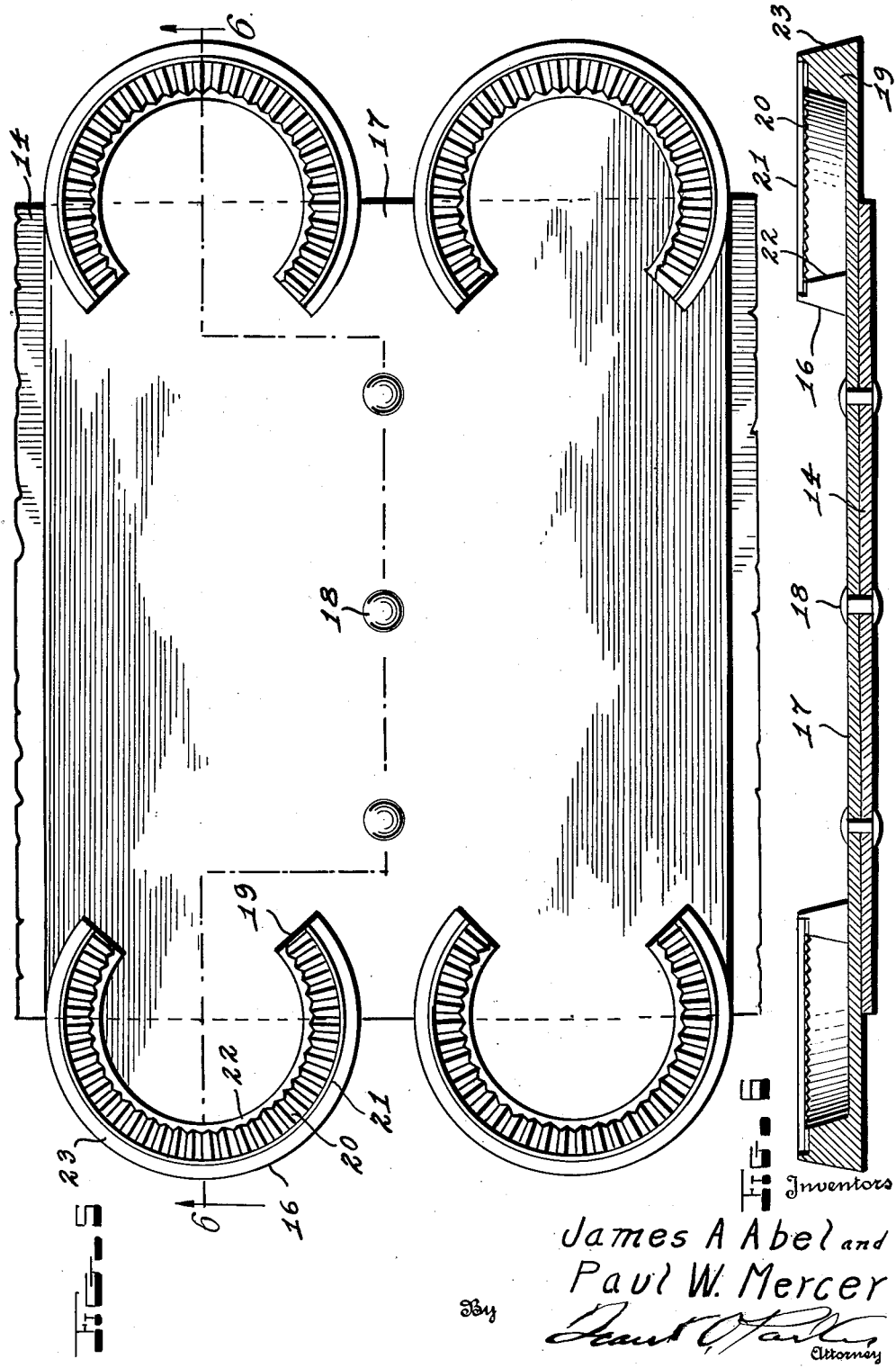
Inventors
James A Abel and
Paul W. Mercer
By
Attorney Patented Mar. 11, 1952

2,588,454

UNITED STATES PATENT OFFICE 2,588,454

PIE MAKING MACHINE

James A. Abel and Paul W. Mercer, Chattanooga, Tenn., assignors of one-third to James A. Mercer, Chattanooga, Tenn.

Application November 26, 1945, Serial No. 630,853

10 Claims. (Cl. 107—1)

This invention relates to a machine for making pies and has for its object to provide a plurality of pie forming die members adapted to receive a folded sheet of dough between which the filling is placed, the die members being mounted on an endless belt movable horizontally beneath a pressure roller which coacts with the die members to shape the pie, cut off the excess dough and crimp the edges to seal the layers of dough together so that when removed from the die the pie is ready for baking or frying.

A further object of the invention resides in providing a machine of the above-mentioned character which is simple and durable in construction, efficient in operation and inexpensive to manufacture.

Other objects and advantages of the invention will be apparent during the course of the following description.

In the accompanying drawings forming a part of this specification and in which like numerals are employed to designate like parts throughout the same, Fig. 1 is a fragmentary top plan view of the machine, Fig. 2 is a longitudinal section taken on the line 2—2 of Fig. 1, Fig. 3 is a vertical section taken on the line 3—3 of Fig. 2, Fig. 4 is a vertical section taken on the line 4—4 of Fig. 2, Fig. 5 is a plan view of one of the sets of die members, and, Fig. 6 is a section taken on the line 6—6 of Fig. 5.

In the drawing wherein for the purpose of illustration a preferred embodiment of the invention is shown the numeral 5 designates a supporting table having a top 6 and legs 7 supported by casters 8. A drum 9 is rotatably mounted at each end of the table having shafts 10 journaled in the legs 7. The shaft 10 of one of the drums extends beyond the leg of the table and has a drive pulley 13 mounted thereon for connection with a suitable prime mover, not shown, for imparting rotary motion to the drum. An endless belt 14 is trained around the drums 9 and is movable horizontally over the top 6 of the table in the direction of the arrow shown in Fig. 1.

Attached to the upper surface of the belt 14 at spaced intervals are sets of die members. As shown each set of die members consists of four dies 16, two of the dies being formed at each end of a plate 17 which is attached to the belt by rivets 18. The plate extends entirely across the belt with the dies projecting beyond the edges thereof. The body 19 of each die is arcuate shape being the segment of a circle with the open side of the body facing inwardly. The top surface of the body is corrugated, as at 20, with an upstanding cutting edge 21 surrounding the outer edge of the top surface and the inner and outer walls 22 and 23 of the body are slightly beveled. As the endless belt travels along the top of the table a sheet of dough of larger width than the die is placed over the die and after the pie filling is placed in the center of the die the sheet of dough is folded over the die with the filling between the two layers of dough.

A pressure roller 24 having spaced annular bands 24' is mounted transversely of the supporting table with its peripheral surface in contacting relation with the cutting edge 21 of the dies as the dies move along the top of the table beneath the roller. When the dies pass beneath the roller the pressure of the roller will press the layers of dough down on the top surface of the die so that the cutting edge 21 will cut off the excess dough from the edge of the pie and at the same time the layers of dough are crimped together by the corrugated surface of the die sealing the layers together. The shaft 23' of roller 24 is journaled at its ends in bearing blocks 25 attached to brackets 25' at each side of the table. The blocks 25 are slidably mounted on the brackets 25' by means of bolts 40 extending from the brackets through the parallel slots 41 in the blocks 25. This permits the roller 24 to be freely movable up and down and if desired a downward pressure may be applied to the roller. Arms 26 extend laterally from the bearing blocks 25 and support an air pipe 27 extending longitudinally of the roller which at one end is connected to a compressed air supply line 27'. The pipe 27 has a pair of discharge pipes 28 extending downwardly therefrom with their discharge ends disposed adjacent the path of travel of the dies to forcibly eject the surplus dough from the sides of the belt 14. Suspended from pipe 27 are a pair of scraper blades 28' having their scraping edge in contact with the peripheral surface of the pressure roller for removing any dough adhering to the surface thereof. The excess dough is ejected from the sides of the belt 14 and drops through opening 35 in the top 6 of the table onto conveyor belt 36 running transversely of the table beneath the opening 35. The belt 36 is trained over rollers 42 and 43 and is driven by a motor 44 connected to one of the rollers by a drive belt 45. An inclined conveyor belt 46 in line with belt 36 carries the scrap dough up to a dough trough. A conveyor belt 30 extends longitudinally along each side of conveyor belt 14 and are trained over rollers 31 and 32. The belts 30 travel in the same direction as belt 14 and support the edge of the folded dough until cut off by the pressure roller whereupon the scrap dough is dumped onto the conveyor belt 36. The pressure roller 24 is enclosed in a housing 33 and mounted in the upper part of the housing over the roller is a burner 34 connected to a gas supply pipe 34' for heating the roller.

In operation, the endless belt carrying the die members moves at a rate of speed to allow the operator to place the sheet of dough and filling material in the die before the dies pass beneath the pressure roller. The pressure roller upon contact with the cutting edge surrounding the die cuts off the surplus dough and mashes the dough down in the corrugations on the top surface of the die to crimp and seal the layers of dough together. The pie thus formed may be easily removed from the die or will drop therefrom as the belt moves around the drum at the end of the table.

It is to be understood that the form of invention herein shown and described is to be taken as a preferred example of the same and that changes in the shape, size and arrangement of the parts may be made within the scope of the subjoined claims.

Having thus described our invention, we claim:

1. A pie making machine comprising an endless belt a plurality of die members carried by said belt to receive pie making materials comprising an arcuate body having a corrugated top surface surrounded by an upstanding cutting edge, conveyor belts along the sides of said endless belt to receive and support the dough material extending from the die members, a pressure roller mounted above said endless belt for contacting engagement with the top surface of said die members to compress the pie making materials and remove the excess dough, and air pressure discharge means directed upon said endless belt adjacent said roller for ejecting the excess dough onto the conveyor belts.

2. A pie making machine comprising an endless belt a plurality of arcuate die members carried by said belt adapted to receive a folded sheet of dough with filling material therebetween, said die members having a top corrugated surface surrounded by an upstanding cutting edge, a pressure roller mounted above said endless belt for contacting engagement with the top surface of said die members to press the layers of dough into the corrugations of the top surface and cause the cutting edge to remove the surplus dough, conveyor belts along the sides of the endless belt for supporting the edges of the dough sheet, and air pressure means disposed above the endless belt for ejecting the surplus dough from the endless belt onto the conveyor belts.

3. A pie making machine comprising a pressure roller, a main conveyor mounted to travel in a horizontal plane beneath said roller, a plurality of die members attached to said conveyor adapted to receive a folded sheet of dough with filling material therebetween, said die members having upstanding cutting edges for contact with said pressure roller for trimming the excess dough from the edge of the pie, and auxiliary conveyors along the sides of said main conveyor adapted to support the excess dough extending from the die members before trimming and thereafter receive and convey the trimmings.

4. A pie making machine comprising a traveling belt, die members attached to and projecting beyond the longitudinal edges of said belt adapted to receive pie making materials, conveyor belts parallel to said traveling belt to receive and support the excess dough material extending from the die members, and means above said traveling belt for co-acting engagement with said die members to remove the excess dough material from the die members.

5. A machine of the character described in claim 4 including means for ejecting the removed dough from the traveling belt onto said conveyor belts.

6. A pie making machine comprising a main traveling belt, auxiliary traveling belts parallel to the edges of said main belt, die members adapted to receive pie making materials attached to said main belt and projecting beyond the edges thereof in overhanging relation to the auxiliary belts whereby the excess dough material beyond the die members is supported by the auxiliary belts and means coacting with the said die members to remove the excess dough material.

7. The combination with a pie making machine having a traveling belt, of a series of die members attached to said belt bordering its longitudinal edges, each die member comprising a base plate, an annular body extending upright from said base plate having a pie forming edge adapted to receive a folded sheet of dough with a filling material therebetween, said body being cut away at the side facing the center of said belt to provide an opening adapted to receive the fold of said sheet of dough.

8. A pie making machine as described in claim 7 wherein said body has a top corrugated face.

9. A pie making machine as described in claim 7 wherein said body has a top face with an upstanding cutting edge around its outer marginal edge.

10. A pie making machine as described in claim 7 wherein said body has a top corrugated face and upstanding cutting edge around its outer marginal edge.

JAMES A. ABEL.
PAUL W. MERCER.

REFERENCES CITED

The following references are of record in the file of this patent:

UNITED STATES PATENTS

| Number | Name | Date |
|---|---|---|
| 835,756 | Hutchison | Nov. 13, 1906 |
| 1,874,511 | Habermaas | Aug. 30, 1932 |
| 1,981,875 | McDonald | Nov. 27, 1934 |
| 2,021,597 | Frost | Nov. 19, 1935 |
| 2,182,079 | Frost | Dec. 5, 1939 |
| 2,232,633 | Richardson | Feb. 18, 1941 |

FOREIGN PATENTS

| Number | Country | Date |
|---|---|---|
| 340,727 | Great Britain | Jan. 8, 1931 |